United States Patent [19]
Dunsmore

[11] Patent Number: 5,541,704
[45] Date of Patent: Jul. 30, 1996

[54] CAMERA WITH LED PHOTOMETER

[75] Inventor: Clay A. Dunsmore, Fairport, N.Y.

[73] Assignee: Eastman Kodak Company, Rochester, N.Y.

[21] Appl. No.: 287,431

[22] Filed: Aug. 8, 1994

[51] Int. Cl.$^6$ .............................. G03B 7/00; G03B 7/099
[52] U.S. Cl. ................................. 354/410; 354/476
[58] Field of Search ........................ 354/476, 410, 354/403, 409, 471; 257/80, 84

[56] References Cited

U.S. PATENT DOCUMENTS

| | | |
|---|---|---|
| 4,460,259 | 7/1984 | Greivenkamp, Jr. et al. .......... 354/403 |
| 4,485,391 | 11/1984 | Poulain et al. ..................... 357/19 |
| 4,534,638 | 8/1985 | Hirohata et al. . |
| 4,561,752 | 12/1985 | Miyamoto et al. . |
| 4,564,756 | 1/1986 | Johnson . |
| 5,109,248 | 4/1992 | Petrakos et al. . |
| 5,408,092 | 4/1995 | Maurice et al. ................... 250/227.21 |

FOREIGN PATENT DOCUMENTS 2207500  2/1989  United Kingdom .

*Primary Examiner*—Michael L. Gellner
*Assistant Examiner*—Matthew Miller
*Attorney, Agent, or Firm*—J. Addison Mathews; David A. Howley

[57] ABSTRACT

A camera including a photoelectric diode operated as an emitter in a first mode and a sensor in a second mode. The camera includes a first circuit that operates the diode to emit visible radiation and a second circuit that operates the diode to sense scene illumination. The diode is switched between the respective circuits selectively to operate in its first and second modes. The first circuit preferably is a timing circuit in a self-timing camera, but also might provide other functions including reduction of red-eye effects. The second circuit preferably is a photometer for controlling exposure.

10 Claims, 1 Drawing Sheet

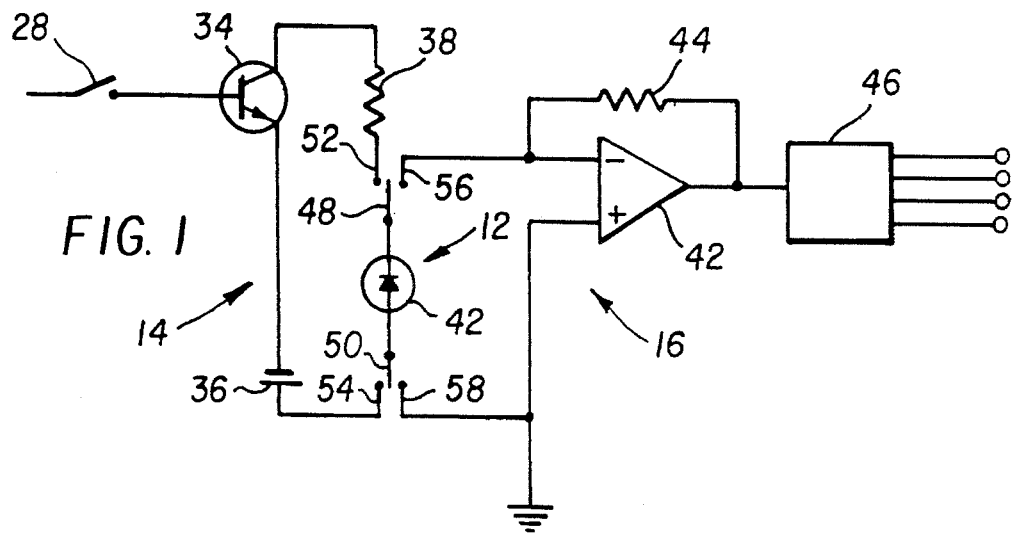
FIG. 1
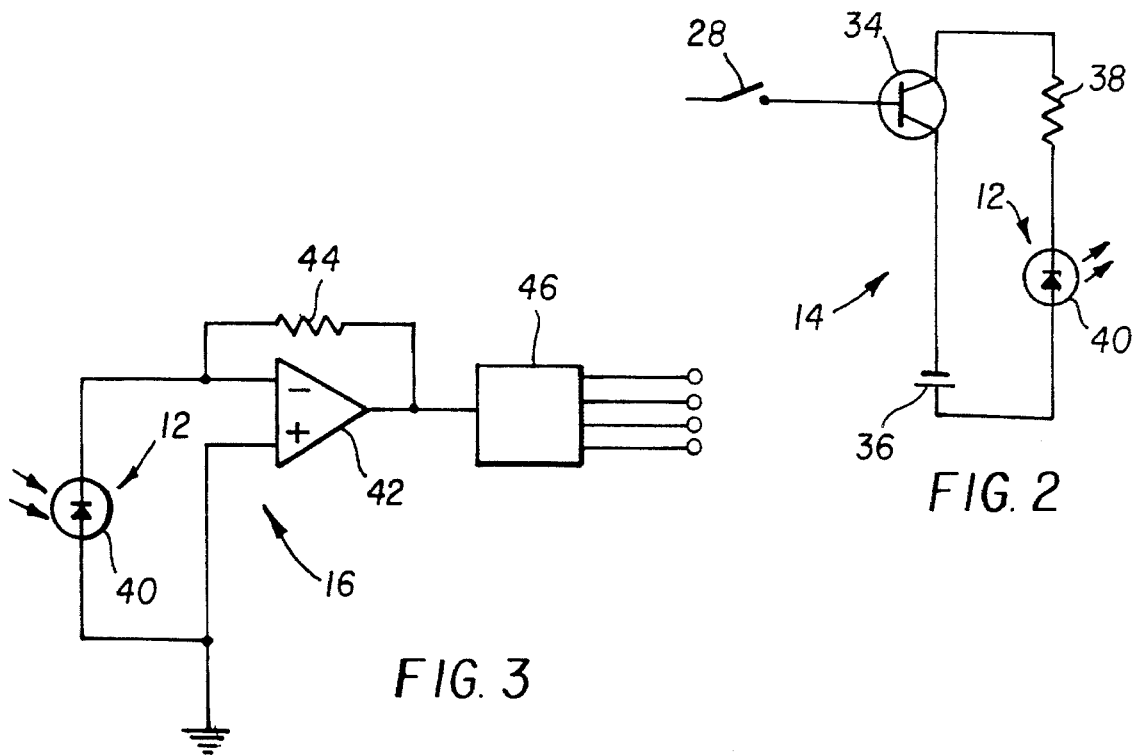
FIG. 2
FIG. 3
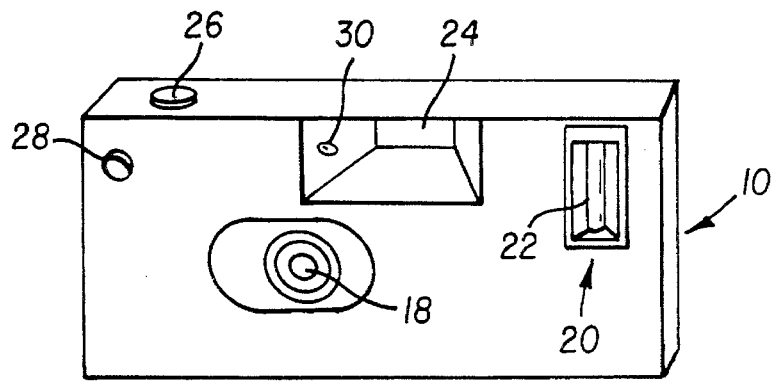
FIG. 4

CAMERA WITH LED PHOTOMETER

BACKGROUND OF THE INVENTION

1. Field of Invention

The invention relates to photometers in photographic cameras, and more specifically to cameras including optoelectronic elements for sensing light and emitting light.

2. Description of the Prior Art

Modern cameras frequently include numerous features that are automated for ease of use and designed for low cost with high quality. Perhaps most pertinent to the present invention are such features that employ photoelectronic devices typically falling into two categories. One category includes light emitters, such as light emitting diodes, that might be used as indicators or sources of illumination. The other includes light sensors, such as a photocells, that respond to light intensity.

A known example in the first category is a self-portrait timing circuit. The camera operator initiates a time-out cycle, delaying the exposure. The operator then has time to join the scene that is photographed. A light emitting diode (LED) usually is employed on the front of the camera to indicate the condition or state of the time-out cycle. In many designs, the LED blinks at a rate depending on the time remaining in the cycle.

Another example, still in the first category, is a light emitting diode (LED) employed for reducing a phenomenon known as "red eye." Flash reflections from the subjects retina produce red spots in the printed image. An LED, again on the front of the camera, is energized under low light conditions when a subjects pupils normally would be dilated and particularly subject to the red eye phenomena. The LED is energized immediately before the exposure, constricting the subjects pupils, and reducing red eye. In this example the emitter is used for illumination.

A known example in the second category is a photometer employing a photocell that senses the level of scene illumination and adjusts the camera for proper exposure. Other examples sense energy from electronic flash devices and quench the flash to control the exposure.

Features in the above described two categories often are combined on the same camera, or have common elements employed for both emitting and sensing radiation. A single power source might be used, for example, to drive or bias light emitting and light sensing devices. U.S. Pat. No. 4,460,259 discloses an example of a common element, a lens, that is used for directing light toward a subject and also for focusing light returned from the subject. The common lens is used with a light emitting element and a light sensing element in a triangulation rangefinder.

PROBLEM SOLVED BY THE INVENTION

Although common elements like batteries and lenses have been used in camera emitting and sensing circuits, separate optoelectronic devices have been required for light emission and light sensing. This adds to the number of required components, increasing camera cost and complexity.

Devices designed for sensing light intensity typically are more expensive than light emitters, especially light emitting diodes (LEDs). Their addition to camera sensing circuits has a significant cost impact, particularly in models designed for markets demanding low price.

In addition to cost and complexity, photoelectronic devices are relatively large compared to other electronic devices. Duplication of such elements complicates small camera design.

SUMMARY OF THE INVENTION

The present invention is directed to overcoming one or more of the problems set forth above, while also providing advantageous features at reduced cost and complexity. Briefly summarized, according to one aspect of the invention, a camera includes a photoelectronic device operated as an emitter in a first mode and a sensor in a second mode. More specifically, the camera includes a first circuit that operates a diode to emit visible radiation and a second circuit that operates the diode to sense scene illumination. The diode is switched between the respective circuits selectively to operate in its first and second modes.

According to more specific features, the diode is disposed on the camera for receiving illumination from the photographic scene. A first circuit operates the diode as a photoemitter and selectively energizes the diode to emit radiation. A second circuit operates the diode as a photosensor, selectively sensing the intensity of light from the scene and using the electrical output of the diode for controlling the exposure.

The invention has particular utility in cameras where the light sensing and emitting elements face in the same direction. The first circuit preferably uses the diode as an indicator in a timer for self portraits, or for preflash illumination to reduce red-eye. The second circuit preferably is a photometer for controlling the camera exposure mechanism or an electronic flash. The light sensing and light emitting elements in such circuits typically face forward. Of course other applications of the invention might use reflecting surfaces for redirecting the sensed and emitted radiation.

The invention reduces the number of parts, the cost and the complexity of photographic cameras that include light emitting and light sensing functions.

These and other features and advantages of the invention will be more clearly understood and appreciated from a review of the following detailed description of the preferred embodiments and appended claims, and by reference to the accompanying drawings.

BRIEF DESCRIPTION OF THE DRAWINGS

FIG. 1 is a schematic view of a circuit in a photographic camera according to a preferred embodiment of the invention, including a photoelectronic device used in light sensing and light emitting circuits.

FIG. 2 is a schematic view corresponding to part of FIG. 1, depicting the light emitting function.

FIG. 3 is a schematic view corresponding to part of FIG. 1, depicting the light sensing function.

FIG. 4 is a schematic perspective view of a camera including the circuit of FIG. 1.

DESCRIPTION OF THE PREFERRED EMBODIMENTS

Referring now to a preferred embodiment of the invention, and to FIGS. 1–4, a photographic camera 10 is depicted including an optoelectronic device 12, a first circuit 14 operating device 12 as an emitter, and a second circuit 16 operating device 12 as a sensor. In this preferred embodiment, and as will become apparent from the following description, optoelectronic device 12 is used alternately as an emitter in a timing circuit and as a sensor in a photometer circuit. The timing circuit is depicted schematically in FIG. 2. The photometer circuit is depicted schematically in FIG. 3. FIG. 1 represents a combination of FIGS. 2 and 3, including appropriate switching elements for alternatively configuring the timing and photometer circuits. FIG. 4 presents a camera incorporating the circuits.

Camera 10 includes appropriate structure and mechanisms for recording images of a scene on a photosensitive medium. The camera is illustrated for purposes of this description with an optical and exposure system 18; an electronic flash device 20, including a photoflash tube 22; a viewfinder 24; and a shutter release 26. Optical and exposure system 18 focuses an image of a scene onto an image plane that supports the photosensitive medium, and controls the exposure. Flash device 20 provides supplemental artificial illumination and is selectively actuated to flash when needed. Viewfinder 24 is an aid for pointing the camera, and shutter release 26 initiates the exposure and flash sequences in proper timed relation with other camera functions. Although the camera 10 is intended for relatively low cost applications, it has numerous automated features including automatic exposure control and flash quenching. Such features are provided by commercial mechanisms widely available and known to those skilled in the art.

The camera further includes a timing device for self portraits. Actuation of switch 28 initiates a time-out sequence that delays the exposure for a predetermined time interval during which the camera operator can join the scene to be photographed. An indicator 30, visible from the front of the camera, provides notification that the timing device is active. When the time-out sequence is completed, the camera is actuated by the timing mechanism to initiate the exposure sequence in the normal manor.

Electrical components of the timing device (FIG. 2) include optoelectronic device 12, transistor 34, battery 36 and resistor 38. The optoelectronic device 12 is a light emitting diode (LED) 40 encased in transmissive material that is the indicator 30 in FIG. 4. When switch 28 is closed to initiate the timing sequence, it turns on transistor 34 allowing current from battery 36 to flow through resistor 38 and the light emitting diode (LED) 40. In this mode of operation, the LED is forward biased and emits light in the visible spectrum to indicate the on or off condition of the timing circuit. Since the LED is visible from the front of the camera, at indicator 30, the operator is notified when the timing mode is active. Such indicators frequently include additional mechanisms for blinking the LED at a rate depending on the time remaining in the cycle, further notifying the operator of the condition or state of the timing circuit.

Electrical components of the photometer (FIG. 3) include light emitting diode (LED) 40, operational amplifier 42, resistor 44 and analog to digital (A/D) converter 46. In this circuit the LED is reverse biased by the offset voltage of the operational amplifier and operates as an inexpensive sensor. As mentioned above in connection with the timing circuit, the LED is located at 30 (FIG. 4) on the front of the camera where it intercepts light reflected from the scene. Light impinging on the LED 40 produces a current that is amplified by the operational amplifier and feed back resistor 44. The operational amplifier 42 also serves to isolate the LED from the load, maintaining the linearity of the LED response to scene illumination. The output of the amplifier 42 is then converted to a digital exposure control signal by analog to digital converter 46.

The preferred embodiment is intended for low cost applications, and therefor does not include additional components for optimizing its operation in the photometer mode. It should be understood, however, that other elements might be added within the scope of the invention. Examples include optical elements for better focusing the scene illumination onto the LED 40, and electrical elements for calibrating the output of the LED when it is used as a sensor.

The circuits of FIGS. 2 and 3 are combined in FIG. 1 with switching elements 48 and 50. In this embodiment, the timing circuit is operated first with switching elements 48 and 50 engaging contacts 52 and 54, respectively. Then, when the timer completes its cycle and initiates the exposure cycle, elements 48 and 50 are switched to contacts 56 and 58, respectively, to measure scene illumination. In simple cameras the photometer circuit might simply determine when supplemental flash illumination is required. In more sophisticated systems, the photometer circuit might also be used to set the camera aperture, time the camera shutter, quench the flash and determine other parameters dependent on scene illumination.

Although the first circuit 14 is depicted in this preferred embodiment as a timer, and the emitter is used as an indicator, other alternatives certainly are within the scope of the invention. Examples include illumination circuits for reducing red eye or for rangefinding. The second circuit preferably is part of a photometer for adjusting exposure conditions, but again, other sensors and sensing circuits within the scope of the invention will become apparent from this description to those skilled in the pertinent arts. The preferred embodiment has been depicted with circuits having discrete interconnected components, but other embodiments of the invention include micro controllers and processors having programs for carrying out the described functions. Such automated operation might be particularly advantageous for switching elements 48 and 50. The claims should by interpreted to fairly cover all such modifications and applications within the true spirit and scope of the invention.

| PARTS LIST FOR FIGURES | |
|---|---|
| Reference No. | Part |
| 10 | Camera. |
| 12 | Optoelectronic Device. |
| 14 | First (timing) circuit. |
| 16 | Second (photometer) circuit. |
| 18 | Optical and exposure system. |
| 20 | Electronic flash device. |
| 22 | Photoflash tube. |
| 24 | Viewfinder. |
| 26 | Shutter release. |
| 28 | Timer actuation switch. |
| 30 | Indicator. |
| 34 | Mode transistor. |
| 36 | Battery. |
| 38 | Resistor. |
| 40 | Light Emitting Diode (LED). |
| 42 | Operational amplifier. |
| 44 | Resistor. |
| 46 | Analog to digital (A/D) converter. |
| 48 | First switching element. |
| 50 | Second switching element. |
| 52 | Contact. |
| 54 | Contact. |
| 56 | Contact. |
| 58 | Contact. |

What is claimed is:

1. A photographic camera including an optical system for focusing scene illumination on an exposure plane, said camera comprising:

a photometer circuit including a light emitting diode electrically coupled as a sensor in said circuit and disposed on said camera for sensing said scene illumination, said light emitting diode not emitting light when electrically coupled as a sensor in said circuit; and a switch for making and breaking said electrical coupling of said light emitting diode in said photometer circuit.

2. The invention of claim 1, including a second circuit and a switch for alternately coupling said light emitting diode electrically in said photometer circuit and said second circuit, respectively.

3. The invention of claim 1, including a timing circuit, and a switch for alternately coupling said light emitting diode electrically in said photometer circuit and said timing circuit, respectively, said photometer circuit biasing said light emitting diode as a sensor, and said timing circuit biasing said light emitting diode as an emitter.

4. A photographic camera comprising:

a diode encased in light transmissive material;

a first circuit operating said diode as a photoemitter;

a second circuit operating said diode as a photosensor; and, means for selectively coupling said diode to said first and second circuits, respectively.

5. The invention of claim 4, wherein said camera records images of a scene, and said diode is disposed for receiving illumination from the scene.

6. The invention of claim 5, wherein said second circuit is a photometer for setting a camera exposure variable.

7. The invention of claim 6, wherein said first circuit includes means using said diode to indicate a condition of said first circuit.

8. A camera for recording images of a scene and including an optical system for focusing the scene at an image plane, said camera comprising:

a diode disposed on said camera for receiving illumination from the scene;

a first circuit operating said diode as a photoemitter and including means for selectively energizing said diode to indicate a condition of said circuit;

a second circuit operating said diode as a photosensor and including means using electrical output of said diode as a photometer for sensing intensity of the scene illumination, said diode not emitting light when being operated as a photosensor, wherein said first circuit is a timing circuit, said camera includes an exposure controlling mechanism, and said second circuit is coupled to said mechanism for adjusting said mechanism according to said intensity.

9. A camera for recording images of a scene, the camera including an optical system for focusing illumination from the scene at an image plane, and an exposure mechanism for controlling intensity of the illumination at said image plane, said camera comprising:

a diode disposed on said camera for receiving illumination from the scene;

a first circuit operating said diode as a photoemitter and including means for selectively energizing said diode to emit visible radiation from said diode;

a photometer operating said diode as a photosensor for sensing said intensity and including means using the electrical output of said diode for controlling said mechanism, said diode not emitting visible radiation when being operated as a photosensor, wherein said first circuit is a timing circuit and said energizing means energizes said diode to indicate a timing condition.

10. The invention of claim 9, wherein said first circuit is controlled to emit radiation from said diode before an exposure to reduce red-eye.

* * * * *